United States Patent [19]
Arnold et al.

[11] 3,841,588
[45] Oct. 15, 1974

[54] ASYMMETRIC AUGMENTATION OF WING FLAPS

[75] Inventors: Alison M. Arnold, Mercer Island; Donald W. Hapke, Issaquah; Frank J. Traeger, Jr., Bellevue, all of Wash.

[73] Assignee: The Boeing Company, Seattle, Wash.

[22] Filed: Aug. 24, 1973

[21] Appl. No.: 391,374

[52] U.S. Cl. ............................ 244/42 CC, 244/52
[51] Int. Cl. ............................................. B64c 15/00
[58] Field of Search .......... 244/42 CC, 42 C, 42 D, 244/42 DA, 40 R, 12 R, 52

[56] References Cited
UNITED STATES PATENTS

| | | | |
|---|---|---|---|
| 2,954,944 | 10/1960 | Huet | 244/12 R |
| 3,259,340 | 7/1966 | Whittley et al. | 244/42 CC |
| 3,432,123 | 3/1969 | Conway et al. | 244/42 CC |

*Primary Examiner*—Trygve M. Blix
*Assistant Examiner*—Barry L. Kelmachter
*Attorney, Agent, or Firm*—Morris A. Case; Glenn Orlob

[57] ABSTRACT

In an airplane, ducting from each engine provides gas to spanwise nozzles along the flaps on a contiguous wing to provide lift and an augmenting thrust; and a greater volume of gas to spanwise nozzles along the flaps and aileron of the opposite wing to provide a larger lift component and a larger augmenting thrust to the opposite wing.

6 Claims, 8 Drawing Figures

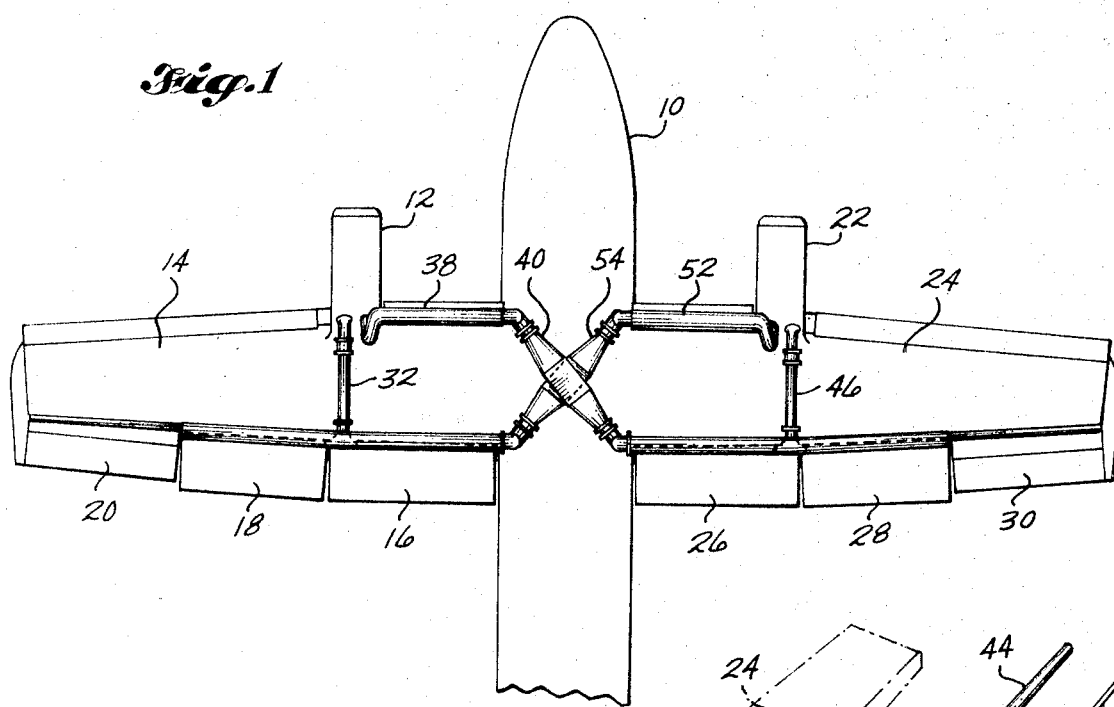
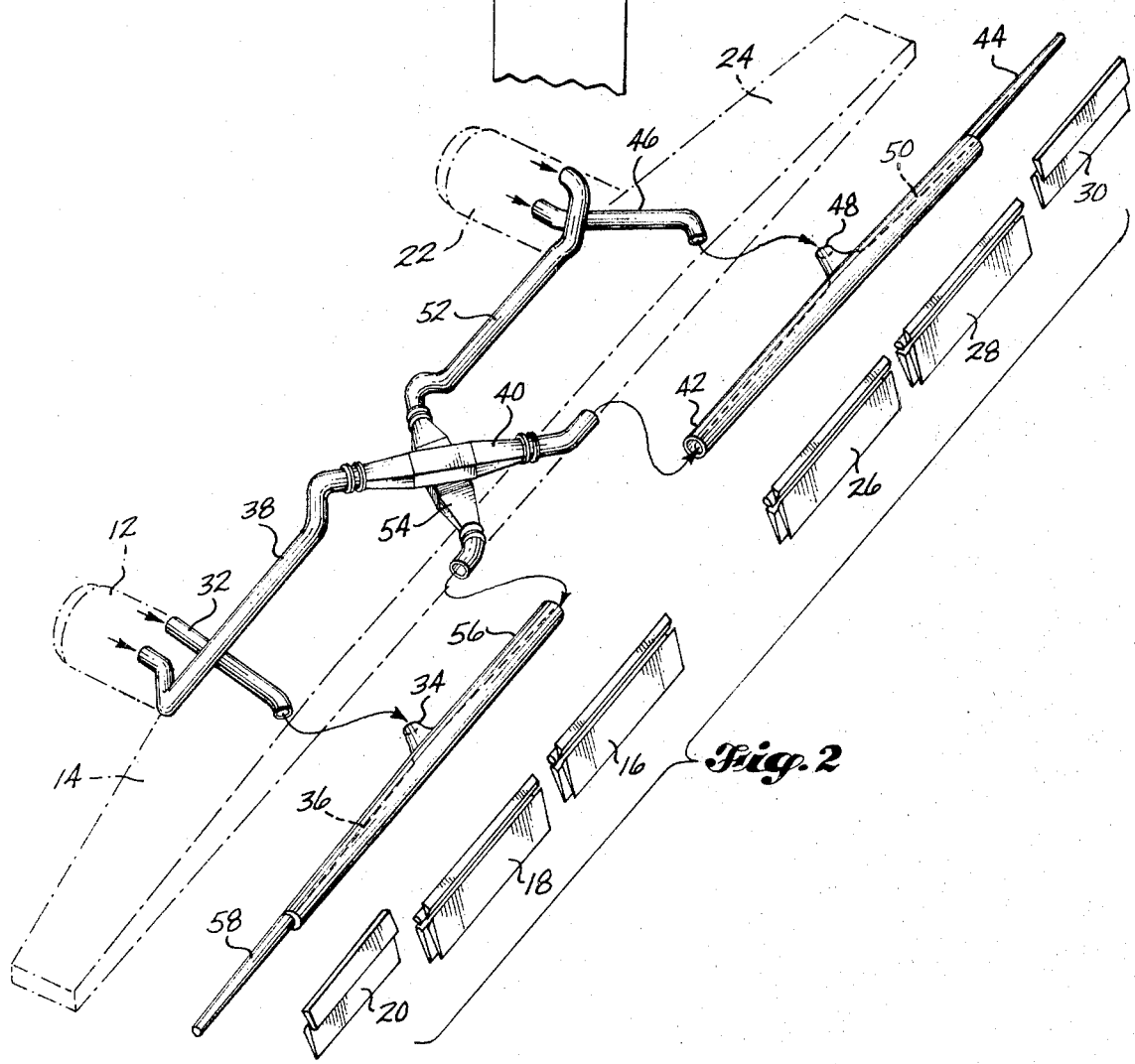

ASYMMETRIC AUGMENTATION OF WING FLAPS

BACKGROUND OF THE INVENTION

If during take-off or landing of an aircraft one of the engines were to fail, it sets up an asymmetrical thrust condition which must be compensated for by automatic or manual means or by inherent design. As a result of the unequal thrust the airplane tends to roll and/or to yaw. A change in the rudder is used to control the yaw and in the aileron to control the roll. It is known to use an augmentor flap system having two independent gas supply systems with half of the gas supply from at least one engine on each wing going to the flaps on one wing and half the gas supply from the same engine going to the flaps on the other wing to provide redundancy in case of failure of an engine. It is also known to automatically blow gas under pressure from an engine on the opposite wing along the upper surface of the aileron located on the wing having the stopped engine to augment said aileron and thereby assist in controlling when an engine goes out. This may furnish sufficient roll control in the situation where the engines are directed essentially straight back, as on conventional aircraft, as the unbalanced thrust has a greater effect on the yaw than on the roll characteristics. With powered lift as used for short take-off and landing aircraft, the thrust of the engines is often vectored downward to impart lift characteristics. When one of these engines fail, particularly during the take-off or landing cycle, it may easily set up a dangerous condition where even a blown aileron does not have sufficient capacity to maintain and restore safe balance to the aircraft without the penalty of an unusually large aileron. It was discovered that balance could be readily restored using gas augmented blown flaps with a preponderance of gas directed to the flaps on the wing having the failed engine.

SUMMARY OF THE INVENTION

Air directed onto flaps is used to augment lift and thrust on the airplane. Each engine has two complete and independent ducting systems for blowing the flaps. One system is directed along the length of the span of the flaps on the same or contiguous wing. The second system is directed along the length of the span of the flaps and also over the surfaces of the aileron on the opposite wing. The second system discharges a greater amount of gas which sets up an asymmetric augmentation blowing system with the opposite wing receiving the greater blowing. When identical systems are set up on each wing and when all engines are in operation, a symmetrical thrust is imparted to the flaps and aileron. If an engine is stopped, an asymmetric thrust is imparted to the flaps and aileron to partially counteract the unbalanced engine thrust to reduce the corrective rudder and/or aileron requirements.

It is an object during an engine out condition to unbalance augmented flap thrust to provide greater lift and thrust to the wing having the dead engine.

It is another object to provide a means of controlling roll and/or yaw in an airplane when occasioned by an engine going dead.

DESCRIPTIONS OF THE DRAWINGS

FIG. 1 shows a plan view of part of an airplane with a schematic of gas distribution from the propulsion units.

FIG. 2 shows an exploded perspective view of the gas distribution system of FIG. 1.

DETAILED DESCRIPTION

Figure 3:
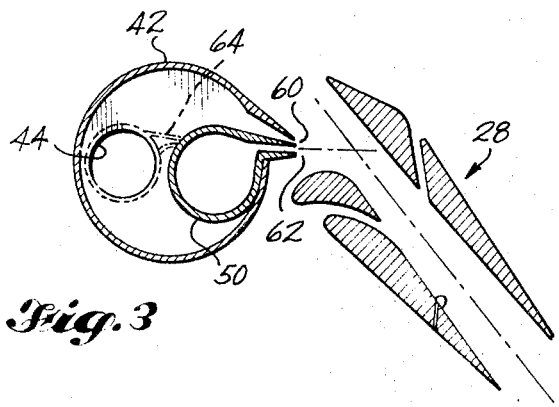
FIG. 3 is a diagrammatic sectional side elevation showing the relation of a gas distribution duct to an extended flap.

Asymmetric blowing of the flaps on an aircraft as shown by this invention may be used on a multiengine airplane having one or more engines on each side of the fuselage. The engines are arranged to be symmetrical with respect to the longitudinal axis. This invention provides for a means to assist in the control of roll and-/or yaw in the situation where one of the engines stops during the critical take-off or landing phases of flight which sets up an asymmetric lift and thrust. The effect of an engine out situation is most critical when there are only two propulsion units as is shown in FIG. 1. Airplane 10 has port propulsion unit 12 mounted to wing 14 which has attached thereto wing flaps 16 and 18 and aileron 20.

Starboard propulsion unit 22 is mounted to wing 24 which has wing flaps 26 and 28 and aileron 30 attached thereto. Each engine has a double distribution system; one of which directs gas to be blown on the flaps on the contiguous wing and the other directs gas to the flaps and to the aileron on the opposite wing. Gas from engine 12 passes through distribution line 32, to header 34 then plenum or flap duct 36. Engine 12 also supplies gas through distribution line 38 and crossover line 40 into plenum or flap duct 42 located on opposite wing 24 thence into aileron duct 44. Engine 22 supplies gas through distribution line 46 into header 48 and plenum or flap duct 50. Engine 22 also supplies gas through distribution line 52, crossover line 54 into plenum or flap duct 56 thence into aileron duct 58.

Figure 5:
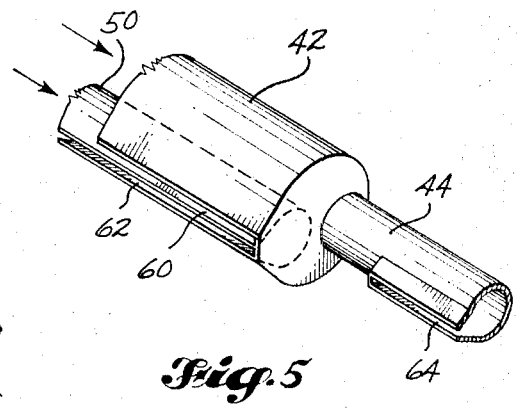
FIG. 5 is a fragmented perspective view of ducting looking into the nozzle part of the ducting.
Figure 4:
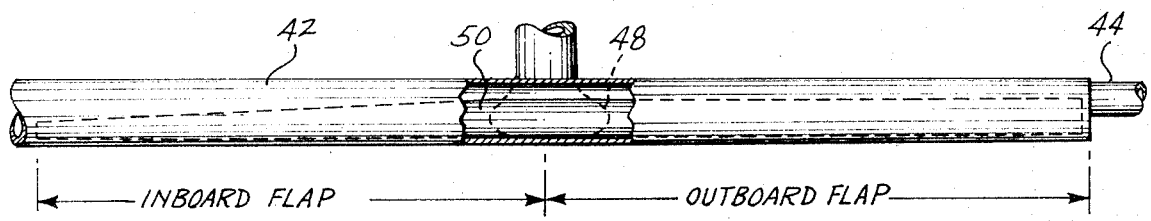
FIG. 4 is a plan view of a spanwise section of ducting.
Figure 8:
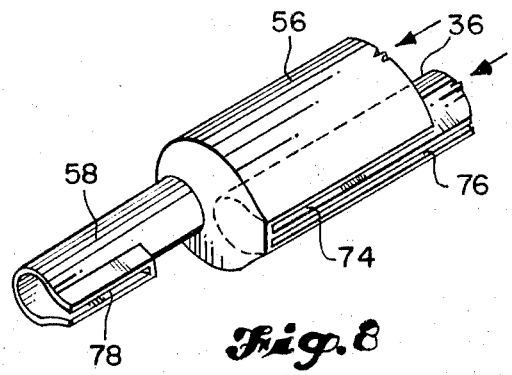
FIG. 8 is a fragmented perspective view of FIG. 5 as shown on an opposite wing.

The flap and the aileron ducts have spanwise nozzles opening off the ducts to direct the gas into the control surfaces. These ducts located in each wing may be two separated ducts each having spanwise nozzles such as disclosed in U.S. Pat. No. 3,347,495, issued Oct. 17, 1967; or may be a duct inside of a duct as herein shown. In FIGS. 3 and 5, flap duct 42 has an aperture forming nozzle 60, flap duct 50 physically located inside duct 42 has aperture forming nozzle 62 both nozzles are located to direct a volume of gas into the flaps to impart an augmenting thrust. When the flaps are in the extended position as shown, it will be both a forward and a lifting type thrust. The aileron duct 44 is apertured spanwise to form nozzle 64 for directing gas over the surface of the aileron to provide thrust and boundary layer control. In FIG. 8, flap duct 56 has an aperture forming nozzle 74, flap duct 36 physically located inside duct 56 has an aperture forming nozzle 76, both nozzles are located to direct a volume of gas into the flap to impart an augmenting thrust. The aileron duct 58 is apertured spanwise to form nozzle 78 for directing gas over the surface of the aileron to provide thrust and boundary layer control. In this embodiment the augmentor system is energized to provide thrust at all flap positions and no valves are required in the ducting system. This gives instantaneous conversion to asymmetric flap augmentation, when an engine goes out, without the need for manual or automatic adjustments.

In operation each engine is supplying gas into a distribution line for blowing the flaps on its contiguous wing and simultaneously blowing gas in a greater amount to the flaps and to the aileron on the opposite wing. A distribution of about 35 to 40 percent of the gas by volume to the contiguous wing and about 60 to 65 percent of the gas by volume to the opposite wing provides a preferred asymmetrical lift and thrust condition to materially assist in both roll and yaw control.

Figure 6:
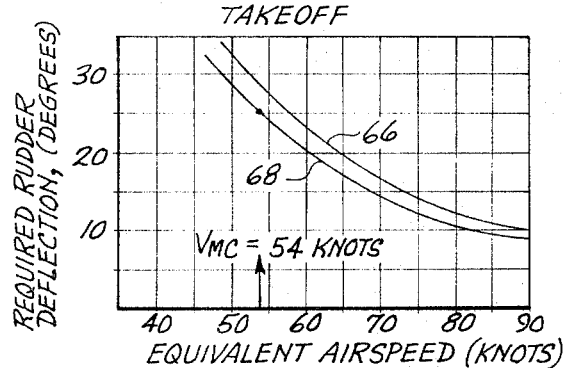
FIG. 6 is a graph illustrating the effect of asymmetric blowing of flaps to assist in control of yaw.

In FIG. 6, a two-engine airplane having symmetrically mounted powered lift engines was directed essentially aft in take-off tests. Required rudder deflection in degrees was plotted versus equivalent airspeed in knots with an engine out condition. A comparison of curve 66 with symmetrical blowing and curve 68 with asymmetrical blowing of about 40 to 60 percent with the larger figure to the engine out wing showed asymmetric blowing aided yaw control.

Figure 7:
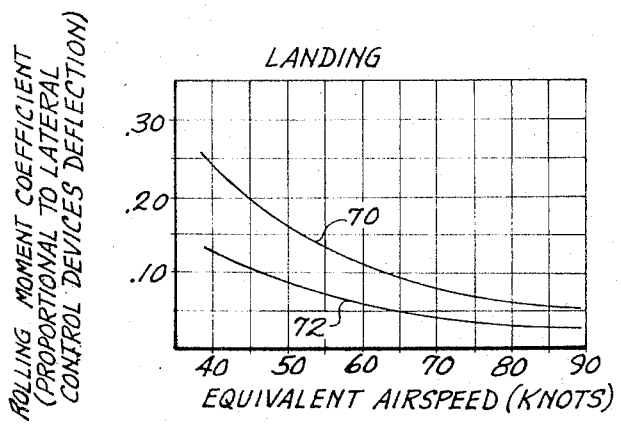
FIG. 7 is a graph illustrating the effect of asymmetric blowing of flaps to assist in roll control.

In FIG. 7, the two-engine airplane having symmetrically mounted powered lift engines were directed downward during landing to provide a vectored lift thrust and to reduce forward thrust, thereby allowing the airplane to operate at the required steady state descent speed. Required control rolling moment coefficient (which is rolling moment in foot-pounds divided by dynamic pressure in pounds per square feet times wing area in square feet times wing span in feet) was plotted versus equivalent airspeed in knots with an engine out condition. A comparison of curve 70 with symmetrical blowing and curve 72 with asymmetrical blowing of about 40 to 60 percent with the larger percentage of air going to the engine out wing shows a considerable improvement in roll control.

We claim:

1. An augmentation flap and aileron mechanism for an airplane having at least two propulsion units placed symmetrically with respect to a longitudinal axis comprising: means for blowing gas under pressure from at least one propulsion unit to augment flaps located on a contiguous wing, means for simultaneously blowing a greater volume of gas under pressure from the same propulsion unit to augment flaps and to blow over upper surfaces of an aileron located on an opposite wing, means for blowing gas under pressure from at least a single second propulsion unit, located on an opposite wing from the first propulsion unit, to independently augment flaps located on a contiguous wing and means for simultaneously blowing a greater volume of air under pressure from the second propulsion unit to independently augment flaps and to blow over upper surfaces of an aileron located on an opposite wing to effect an asymmetric flap augmentation when one of the engines fail.

2. An augmentation flap and aileron mechanism for an airplane having at least two propulsion units placed symmetrically with respect to a longitudinal axis comprising: a pair of independent rearwardly directed thrust nozzles mounted in each of a pair of wings wherein a first nozzle in each pair directs a chordwise stream of gas along a span of the flaps and a second nozzle in each pair directs an independent chordwise stream of gas along the span of the flaps and also over the top surface of the aileron; means for supplying gas under pressure from at least one propulsion unit on each wing to the first nozzle on a contiguous wing and a larger volume of gas to the second nozzle on an opposite wing such that upon the failure of a propulsion unit the flaps on the wing having the failed propulsion unit receive a greater amount of thrust producing gas than the flaps on the opposite wing.

3. A method of providing an assist to roll and yaw control of an airplane when an engine fails during take-off or landing with the steps comprising:
   a. directing gases from at least one propulsion unit on each of a pair of wings to blow flaps on a contiguous wing, and
   b. directing a greater volume of gases from the same propulsion units to blow flaps and an aileron on an opposite wing from the propulsion unit.

4. An augmentation flap and aileron mechanism for an airplane to impart symmetrical augmentation with all engines in operation and automatic asymmetric augmentation, with greater augmentation to an engine out wing, when an engine goes out comprising: a pair of ducts, located on a wing, each having a spanwise nozzle to direct a chordwise stream of gas; a second pair of ducts located on an opposite wing each having a spanwise nozzle to direct a chordwise stream of gas; a first nozzle in each pair of ducts directs the stream of gas to augment flaps; a second nozzle in each pair of ducts directs the stream of gas to augment flaps and an aileron; at least one engine on each wing; a double distribution system from each engine to direct blown gas under pressure through the ducts wherein one distribution system directs blown gas through the first nozzle in each pair of ducts to flaps on a contiguous wing and the other distribution system directs a larger volume of gas through the second nozzle in each pair of ducts to the flaps and aileron on the opposite wing.

5. An augmentation flap and aileron mechanism as in claim 4 wherein the pair of ducts located on each wing comprise a duct inside of a duct with the first duct of each pair having the second duct located inside.

6. In a short take-off and landing aircraft having a pair of wings, at least two propulsion units placed symmetrically with respect to a longitudinal axis each capable of being vectored downward to impart lift, and an augmentation flap and aileron system wherein the improvement comprises: means for blowing gas under pressure from each propulsion unit to augment flaps located on a contiguous wing, means for simultaneously blowing a greater volume of gas under pressure from each propulsion unit to augment flaps and to blow over upper surfaces of an aileron located on an opposite wing to effect symmetrical flap and aileron augmentation with all propulsion units operating and an asymmetric flap and aileron augmentation when a propulsion unit fails with the greater augmentation directed to the flaps and aileron on the wing having the failed propulsion unit.

* * * * *